United States Patent
Lu et al.

(10) Patent No.: US 9,860,783 B2
(45) Date of Patent: Jan. 2, 2018

(54) CONGESTION STATE REPORTING METHOD AND ACCESS NETWORK DEVICE

(71) Applicant: Huawei Technologies Co., Ltd., Shenzhen (CN)

(72) Inventors: Wei Lu, Shenzhen (CN); Yijun Yu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 125 days.

(21) Appl. No.: 14/566,034

(22) Filed: Dec. 10, 2014

(65) Prior Publication Data

US 2015/0098325 A1    Apr. 9, 2015

Related U.S. Application Data

(63) Continuation of application No. PCT/CN2012/077733, filed on Jun. 28, 2012.

(51) Int. Cl.
*H04W 28/02* (2009.01)
*H04M 15/00* (2006.01)
(Continued)

(52) U.S. Cl.
CPC ..... *H04W 28/0252* (2013.01); *H04L 12/1407* (2013.01); *H04L 12/1489* (2013.01);
(Continued)

(58) Field of Classification Search
None
See application file for complete search history.

(56) References Cited

U.S. PATENT DOCUMENTS

| 2008/0259873 A1* | 10/2008 | Ahmavaara ....... H04W 36/0033 370/331 |
| 2010/0322163 A1* | 12/2010 | Bhalla ............... H04W 36/0066 370/329 |

(Continued)

FOREIGN PATENT DOCUMENTS

| CN | 101534566 A | 9/2009 |
| CN | 101553008 A | 10/2009 |

(Continued)

OTHER PUBLICATIONS

Srinivasan, U.S. Appl. No. 61/552,421, filed Oct. 27, 2011.*

(Continued)

*Primary Examiner* — Brandon Renner
*Assistant Examiner* — Jay Vogel
(74) *Attorney, Agent, or Firm* — Leydig, Voit & Mayer, Ltd.

(57) ABSTRACT

A congestion state reporting method and an access network device are provided by the present invention. The method comprises: obtaining, by an access network device, an identifier of a gateway device corresponding to bearers, and reporting to the gateway device congestion state information of a cell covered by the access network device via part of bearers from the bearers corresponding to the identifier. The method mentioned above can avoid the problem in the prior art that the congestion state is further aggravated, so that the gateway device can process the problem of cell congestion more rapidly, and can reduce the processing complexity of the gateway device in the prior art.

19 Claims, 6 Drawing Sheets

(51) Int. Cl.
*H04L 12/14* (2006.01)
*H04W 36/00* (2009.01)

(52) U.S. Cl.
CPC ....... *H04M 15/66* (2013.01); *H04M 15/8016* (2013.01); *H04M 15/8027* (2013.01); *H04W 28/0284* (2013.01); *H04W 36/0005* (2013.01); *H04W 36/0055* (2013.01)

(56) References Cited

U.S. PATENT DOCUMENTS

| | | | |
|---|---|---|---|
| 2011/0141890 A1* | 6/2011 | Giaretta | H04W 28/20 370/232 |
| 2011/0235605 A1* | 9/2011 | Yeoum | H04W 72/04 370/329 |
| 2012/0020318 A1* | 1/2012 | Naoe | H04W 8/26 370/329 |
| 2012/0082314 A1* | 4/2012 | Fukuda | H04L 63/061 380/270 |
| 2012/0087330 A1 | 4/2012 | Zhu et al. | |
| 2013/0010598 A1* | 1/2013 | Ludwig | H04L 47/10 370/235 |
| 2013/0021916 A1* | 1/2013 | Zhou | H04W 28/0284 370/241 |
| 2013/0070691 A1* | 3/2013 | Ludwig | H04W 72/044 370/329 |
| 2013/0294403 A1* | 11/2013 | Srinivasan | H04W 36/165 370/331 |
| 2014/0369203 A1 | 12/2014 | Luo et al. | |
| 2015/0085662 A1 | 3/2015 | Hu et al. | |

FOREIGN PATENT DOCUMENTS

| | | |
|---|---|---|
| CN | 101932034 A | 12/2010 |
| CN | 102075898 A | 5/2011 |
| CN | 102149069 A | 8/2011 |
| CN | 102742318 A | 10/2012 |
| CN | 102761479 A | 10/2012 |
| WO | WO 2006052174 A1 | 5/2006 |
| WO | WO 2009152861 A1 | 12/2009 |
| WO | WO 2010149084 A1 | 12/2010 |
| WO | WO 2011098155 A1 | 8/2011 |
| WO | WO 2011127778 A1 * | 10/2011 ............ H04W 28/00 |

OTHER PUBLICATIONS

"3$^{rd}$ Generation Partnership Project; Technical Specification Group Services and System Aspects; General Packet Radio Service (GPRS) enhancements for Evolved Universal Terrestrial Radio Access Network (E-UTRAN) access (Release 10)," 3GPP TS 23.401, V10.7.0, pp. 71, 116, and 119, 3$^{rd}$ Generation Partnership Project, Valbonne, France (Mar. 2012).

"3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300, V10.7.0, pp. 124-126, 3$^{rd}$ Generation Partnership Project, Valbonne, France (Mar. 2012).

"3$^{rd}$ Generation Partnership Project; Technical Specification Group Radio Access Network; Evolved Universal Terrestrial Radio Access Network (E-UTRAN); S1 Application Protocol (S1AP) (Release 10)," 3GPP TS 36.413, V10.5.0, pp. 81, 3$^{rd}$ Generation Partnership Project, Valbonne, France (Mar. 2012).

"3$^{rd}$ Generation Partnership Project; Technical Specification Group Radio Access Network; Evolved Universal Terrestrial Radio Access Network (E-UTRAN); X2 application protocol (X2AP) (Release 10)," 3GPP TS 36.423, V10.5.0, pp. 13-14 and 30-31, 3$^{rd}$ Generation Partnership Project, Valbonne, France (Mar. 2012).

1$^{st}$ Office Action in corresponding Chinese Patent Application No. 20120000885 (dated Aug. 2, 2016).

* cited by examiner

CONGESTION STATE REPORTING METHOD AND ACCESS NETWORK DEVICE

CROSS-REFERENCE TO RELATED APPLICATIONS

This application is a continuation of International Application No. PCT/CN2012/077733, filed on Jun. 28, 2012, which is hereby incorporated by reference in its entirety.

TECHNICAL FIELD

Embodiments of the present invention relate to the communication field, and in particular, to a congestion state reporting method and an access network device.

BACKGROUND

In the current long term evolution (LTE for short) system, when a user equipment (UE) performs packet switched (PS for short) services, via an eNodeB (eNB for short) of an evolved Universal Mobile Telecommunications System territorial radio access network (E-UTRAN for short) system device, a mobility management entity (MME for short) and a serving gateway (S-GW for short), a data plane transmission tunnel with a packet data network gateway (P-GW for short) and a policy and charging rules function (PCRF for short) device and so on, is established through a control signaling.

In other words, the UE accesses a core network via an attachment process at first, and during the process of accessing the core network, the MME may initiate, based on an access point (APN for short), a packet data network (PDN for short) connection establishing process, and then establish a data plane transmission tunnel, i.e., a bearer which carries a data flow of the user equipment, for the data transmission of the user equipment.

However, due to the limited capacity of each cell deployed in a wireless network, congestion may be resulted from excessive accessing of the user equipments, for example, a cell includes a lot of user terminals such as ($UE_1$, $UE_2$, $UE_3$ ... $UE_N$), then each UE uses a plurality of bearers via an eNB, which thereby easily leads to the congestion of the cell.

At present, there are only two following ways in which a gateway device at a core network side learns the congestion state of a cell, one way is that: when the cell is congested, an access network device such as an eNB sends a congestion notifying message to a mobility management entity (such as a MME or a SGSN), after the gateway device at the core network side or a policy and charging control (PCC for short) device learns that the cell is congested, an operation of deactivating some bearers or separating some users to relieve the congestion state may be initiated; the other way is that: when the cell is congested, the eNB sends a notifying message to the gateway device at the core network side via a data plane tunnel of a bearer, such as by setting a congestion state instruction in a header of an uplink data packet in the data plane tunnel, so that the gateway device senses the cell congestion, and further notifies the core network to initiate an operation of modifying quality of service (QoS for short) of the bearer or an application service flow, such as but not limited to decreasing a maximum bit rate (MBR for short) and a guaranteed bit rate (GBR for short), which serves to relieve the congestion state.

However, a drawback according to the first aforementioned way is that there is no similar processing procedure in the present 3GPP protocol, if such a process is added, there may be great influences on the existing protocol; a drawback of the second way is that a congestion state indication is added to the uplink data packet of each bearer, so that each gateway device may receive lots of uplink data packets including the reported congestion state, which further aggravates the congestion state and may increase the processing complexity of the gateway device such as a P-GW and decrease the processing performance of the gateway device.

SUMMARY

In view of the disadvantages in the prior art, the present invention provides a congestion state reporting method and an access network device for reducing a processing complexity of a gateway device on processing the cell congestion in the prior art.

An embodiment of the present invention provides a congestion state reporting method, comprising:

obtaining, by an access network device, an identifier of a gateway device corresponding to bearers, and reporting to the gateway device congestion state information of a cell covered by the access network device via part of bearers from the bearers corresponding to the identifier.

An embodiment of the present invention provides an access network device, comprising:

an obtaining unit, configured to obtain an identifier of a gateway device corresponding to bearers;

a sending unit, configured to report to the gateway device congestion state information of a cell covered by the access network device via part of bearers from the bearers corresponding to the identifier.

As can be seen from the aforementioned technical solutions, the congestion state reporting method and the access network device in the embodiments of the present invention can obtain an identifier of a gateway device at a core network side in advance, and then report to the gateway device the congestion state information of a cell covered by the access network device via part of bearers from the bearers corresponding to the identifier, thereby reducing the processing complexity of the gateway device on processing the cell congestion in the prior art, so that the gateway device can be simplified when processing the cell congestion, and the processing performance of the gateway device can be better improved.

BRIEF DESCRIPTION OF DRAWINGS

To describe the technical solutions of the present invention more clearly, the following briefly introduces the accompanying drawings used in embodiments. Apparently, the following accompanying drawings are merely the accompanying drawings of some embodiments of the present invention, and persons of ordinary skill in the art may still derive other drawings of the technical solutions of the present invention from these accompanying drawings without creative effort.

DESCRIPTION OF EMBODIMENTS

In order to make the objects, technical solutions, and advantages of the present invention clearer, the technical solutions of the present invention are hereinafter described clearly and completely with reference to the accompanying drawings in embodiments of the present invention. Obviously, the following embodiments described are part of the embodiments of the present invention. Other embodiments which can solve the technical problem of the present invention and realize the technical effect of the present invention can be obtained by persons skilled in the art on the basis of each of the following embodiments of the present invention without any creative efforts by equivalently transforming part of or all of technical features, and these respective embodiments obviously fall within the protection scope of the present invention.

Figure 1:
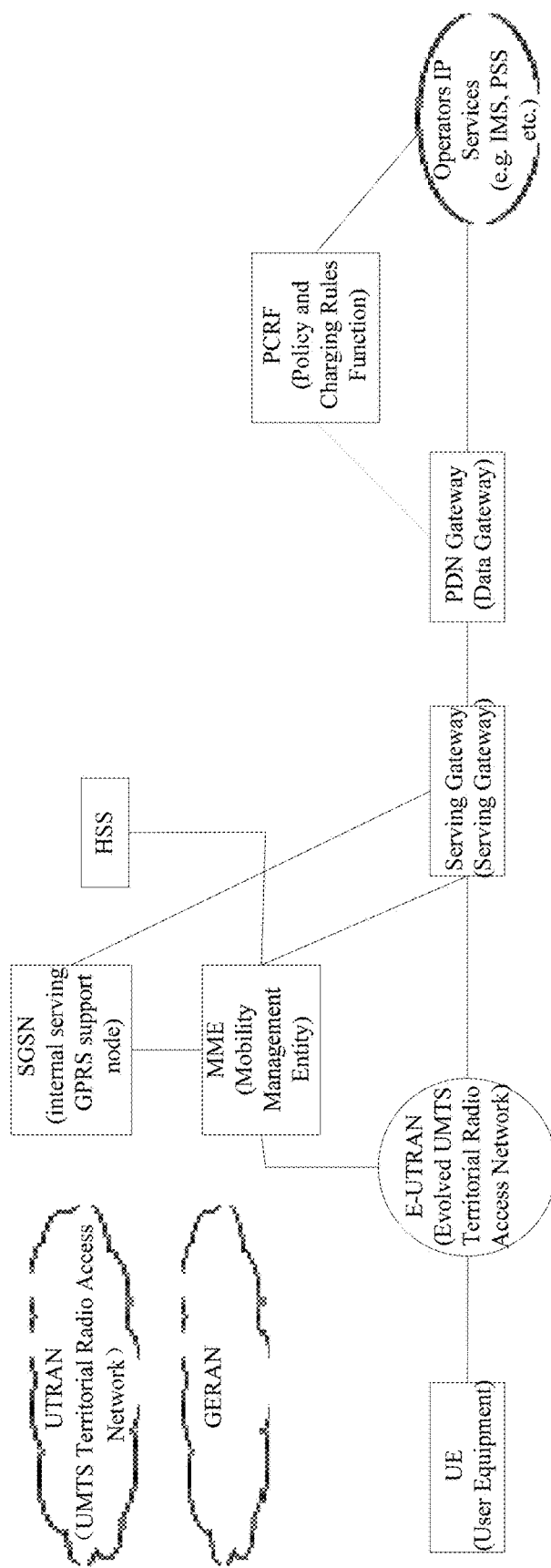
FIG. 1 is a scene graph where a congestion state reporting method of the present invention is applied.

As shown in FIG. 1, at present, a core network of the long term evolution network (LTE) mainly includes three logical function entities which are an MME, an S-GW, and a P-GW.

Wherein, the MME is responsible for a non-access-stratum (NAS for short) signaling and encryption of the NAS signaling, roaming, tracking, allocating a temporary identifier for a user, securing and other functions, which corresponds to a control plane part of an internal serving GPRS support node (SGSN for short) in the current universal mobile telecommunications system (UMTS for short). What should be understood is that, in the LTE architecture, the MME owns only a control plane, in other words, user plane data flows do not go by the MME, while in a UMTS territorial radio access network (UTRAN for short) system, the SGSN owns both a control plane and a user plane at the same time, in other words, the SGSN not only manages a signaling processing, but also performs as a user plane tunnel.

The S-GW in the LTE is responsible for a local mobility anchor point and a mobility anchor point inside the 3GPP system, and the function of legally monitoring relevant information.

The P-GW in the LTE is responsible for policy enforcement, charging and legally monitoring relevant functions, and corresponds to functions of a gateway device, namely a gateway GPRS support node (GGSN for short) in the UMTS system.

Besides, the E-UTRAN in FIG. 1 is responsible for wireless access layer signaling and user data transmission, which corresponds to an access network system UTRAN in the UTMS system.

Figure 2:
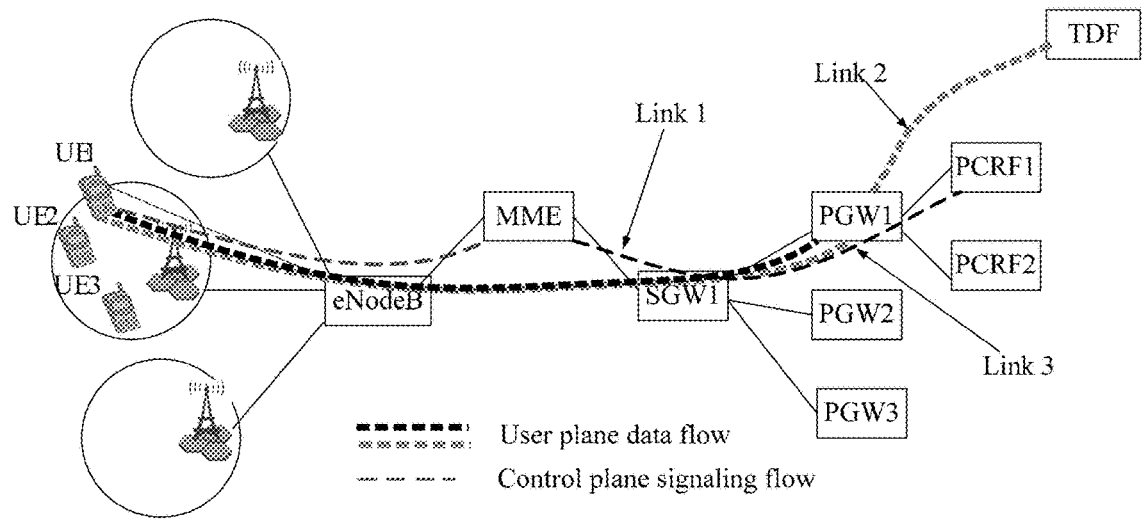
FIG. 2 is a schematic diagram of a user plane data flow of a user terminal in the present invention.

FIG. 2 shows a schematic diagram of a user plane data flow of a user terminal in the present invention, as shown in FIG. 2, each cell includes a plurality of UEs, and when performing packet data services, each UE establishes user data transmission tunnels (link 2, link 3 as shown in FIG. 2) via the eNB, the MME, the S-GW, the P-GW and the PCC and other devices through a control signaling (link 1 as shown in FIG. 2), and then service data sent by the UE can be transmitted through the user data transmission tunnels.

Usually, the UE accesses a network via an attaching process, and during the process of accessing the network, the MME may initiate, based on the APN, a PDN connection establishing process (such as by allocating endpoint identifiers of the user data transmission tunnels), and thereby establish the user data transmission tunnels, namely bearers which the UE uses to transmit data flows, for the data transmission of the UE.

Figure 3:
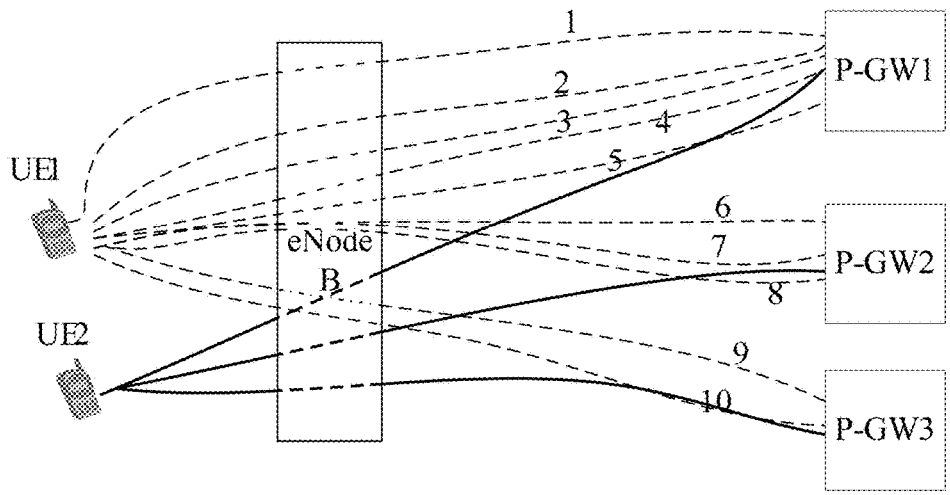
FIG. 3 is a schematic view of a PDN connection of the user terminal in the present invention.

In the prior art, a plurality of PDN connections may be established on each UE, and each PDN connection may include a plurality of bearers, as shown in FIG. 3, $UE_1$ establishes 10 bearers (dotted lines as shown in FIG. 3), $UE_2$ establishes 3 bearers (solid lines as shown in FIG. 3).

Where, bearer 1, bearer 2, bearer 3 among the 10 bearers of $UE_1$ belong to one PDN connection, bearer 4 and bearer 5 belong to another PDN connection, and both of the two PDN connections connect to the gateway device $P\text{-}GW_1$, bearer 6, bearer 7, bearer 8 among the 10 bearers of $UE_1$ establish a PDN connection with $P\text{-}GW_2$, and bearer 9 and bearer 10 establish a connection with $P\text{-}GW_3$.

Certainly, other terminal devices which are in the same cell with $UE_1$ may also establish bearers (such as bears of $UE_2$) with $P\text{-}GW_1$, $P\text{-}GW_2$, $P\text{-}GW_3$.

At this moment, if the cell where $UE_1$ and $UE_2$ locate is congested, the current way of reporting the congestion state may be that: the eNB needs to set information indicating the congestion state in all the uplink data packets in the 10 bearers of $UE_1$, and the information indicating the congestion state is also set in the uplink data packets in bearers of devices which belong to the same congested cell with $UE_1$, therefore each gateway device such as $P\text{-}GW_1$, $P\text{-}GW_2$, $P\text{-}GW_3$ may receive a lot of uplink data packets including the reported congestion state, which may aggravate the congestion state, and may increase the processing complexity of the gateway device P-GW and decrease the processing performance of the gateway device. Therefore, embodiments of the present invention provide a congestion state reporting method, which solves the problem of aggravating the congestion state in the prior art.

The access network device in the following embodiments may be an eNB or a radio network controller (RNC).

Figure 4:
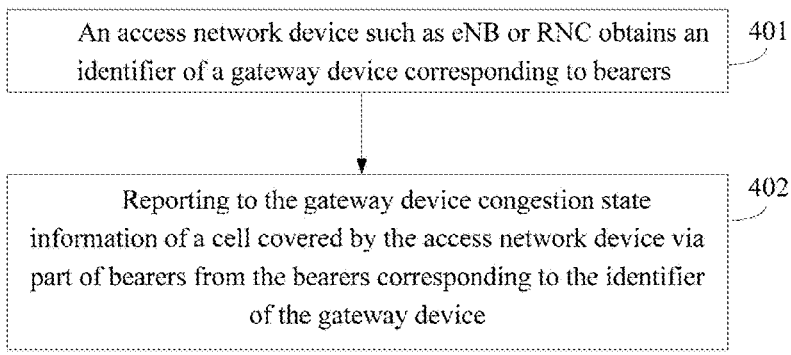
FIG. 4 is a flow chart of a congestion state reporting method according to an embodiment of the present invention.

FIG. 4 is a flow chart of a congestion state reporting method according to an embodiment of the present invention, as shown in FIG. 4, the congestion state reporting method according to the embodiment of the present invention is described as follows.

401, an access network device such as an eNB or a RNC obtains an identifier of a gateway device corresponding to bearers.

Taking FIG. 3 as an example, the access network device in this step may obtain the identifier of the $P\text{-}GW_1$, the identifier of the $P\text{-}GW_2$, and the identifier of the $P\text{-}GW_3$ at the core network side corresponding to the 10 bearers of $UE_1$, of course, the access network device may also obtain identifiers of the P-GWs corresponding to bearers of other UEs. A correspondence between the bearers and the P-GWs can be obtained by obtaining identifiers of the P-GWs corresponding to the bearers.

For example, during a process of establishing default bearers by a user equipment, obtaining identifiers of gateway devices corresponding to the default bearers;

or, during a process of establishing dedicated bearers for a user equipment by a network element at the core network side, obtaining identifiers of gateway devices corresponding to the dedicated bearers;

or, during a handover process of a user equipment from a source access network to a target access network, obtaining identifiers of gateway devices corresponding to bearers of the user equipment;

or, during switching process of a user equipment from an idle state to a connected state, obtaining identifiers of gateway devices at the core network side which correspond to bearers of the user equipment.

The obtaining ways in the aforementioned step 401 are described in the following embodiments.

402, reporting to the gateway device congestion state information of a cell covered by the access network device via part of bearers from the bearers corresponding to the identifier of the gateway device.

For example, when the cell covered by the access network device is congested, the congestion state information indicating that the cell is congested is reported to the gateway device. When the cell is not congested, the congestion state information indicating that the cell is normal instead of congested is reported to the gateway device. The congestion state information of the cell covered by the access network device is reported to the gateway device via part of bearers from the bearers corresponding to the identifier of the gateway device, in other words, the congestion state information of the cell covered by the access network device is reported to the gateway device via part of bearers which are chosen from the bearers corresponding to the identifier according to the correspondence between the identifier of the gateway device and the bearers. When the congestion state information of the cell covered by the access network device is reported to the gateway device via part of bearer from the bearers corresponding to the identifier of the gateway device, the congestion state information can be included in all uplink data packets of the aforementioned part of bearers, or the congestion state information can be also included in part of uplink data packets, which is not limited in the embodiment of the present invention.

For example, when the cell covered by the access network device is congested, the congestion state information is reported to the gateway device via a bearer of the bearers corresponding to the identifier.

Combining with FIG. 3, the congestion state information can be reported to P-GW$_3$ via bearer 1 (here the bearer can be any one of bearers 1 to 5) from the bearers corresponding to the identifier of P-GW$_3$, the congestion state information can be reported to P-GW$_2$ via bearer 7 (here the bearer can also be bearer 8 or bearer 6) from the bearers corresponding to the identifier of P-GW$_2$, and the congestion state information can be reported to P-GW$_3$ via bearer 9 (here the bearer can also be bearer 10) from the bearers corresponding to the identifier of P-GW$_3$. For example, a congestion state indication can be added in uplink data packets of bearer 1, bearer 7, bearer 9, and then the gateway devices (P-GW$_3$, P-GW$_2$ and P-GW$_3$) may learn that the cell the terminal currently resides is congested after receiving the aforementioned uplink data packets, and performs a solution to relieve the congestion of the current congested cell.

In other embodiments, the eNB herein may choose part of bearers of UE$_1$, such as bearer 1, bearer 3, bearer 6, bearer 9, bearer 10 and so on to report the congestion state information to P-GW$_1$, P-GW$_2$, P-GW$_3$; or the eNB may choose part of/all bearers of UE$_2$ to report the congestion state information to P-GW$_1$, P-GW$_2$, P-GW$_3$ respectively, which ensures that every gateway device can learn the congestion state information of the cell, and the embodiment does not limit bearers chosen by the access network device.

The embodiment does not limit the amount of part of bearers from the bearers corresponding to the identifier, which may be set according to an actual requirement, optionally, the congestion state information of the cell covered by the access network device can be reported to the gateway device via a bearer from the bearers corresponding to the identifier of the gateway device.

As can be seen from the above embodiment, in the congestion state reporting method of the present embodiment, an identifier of a gateway device at the core network side is obtained in advance, and then the congestion state information of the cell covered by the access network device is reported to the gateway device via part of bearers from the bearers corresponding to the identifier, thereby reducing the processing complexity of the gateway device on processing the cell congestion in the prior art, so that the gateway device can be simplified when processing the cell congestion, and the processing performance of the gateway device can be better improved.

Figure 5A:
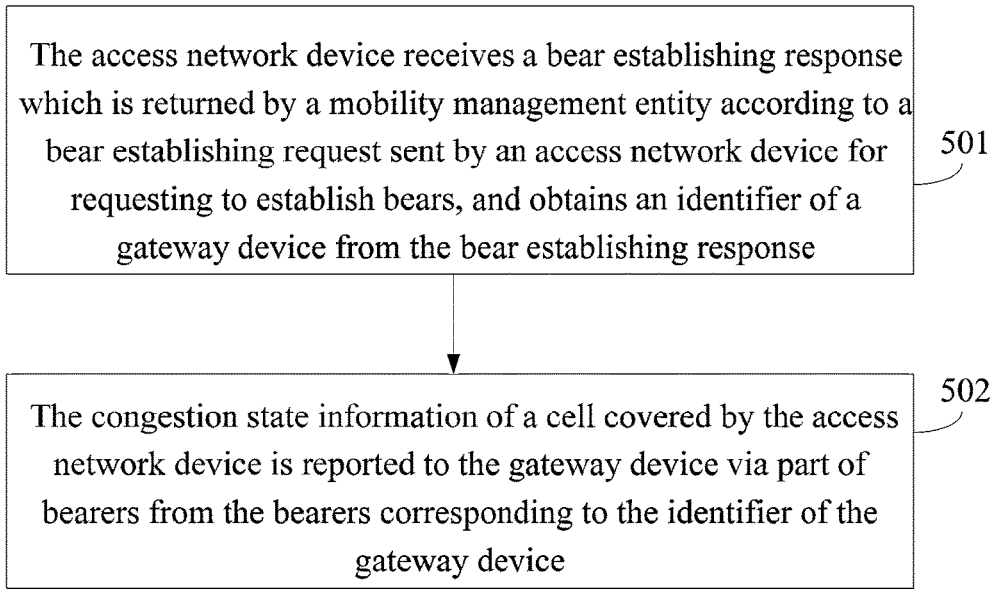
FIG. 5A and FIG. 5B are flow charts of congestion state reporting methods according to another embodiment of the present invention.

FIG. 5A shows a flow chart of a congestion state reporting method according to an embodiment of the present invention, as shown in FIG. 5A, the congestion state reporting method in this embodiment is described as below.

501, the access network device receives a bear establishing response which is returned by a mobility management entity according to a bear establishing request sent by an access network device for requesting to establish bears, and obtains an identifier of a gateway device from the bear establishing response.

For example, during a process of establishing default bearers by a user equipment, the access network device such as an eNB receives the bear establishing response which is returned by the MME at the core network side according to the bear establishing request sent by the access network device, and the bear establishing response includes the identifier of the gateway device.

502, congestion state information of a cell covered by the access network device is reported to the gateway device via part of bearers from the bearers corresponding to the identifier of the gateway device.

Preferably, during the process of establishing bearers with the same gateway device, the access network device chooses part of bearers to report to the gateway device the congestion state information.

Combining with FIG. 3, two terminals UEs reside the eNB, such as UE$_1$, UE$_2$, 10 bearers are established on UE$_1$ to perform services, as shown in FIG. 3, bearer 1, bearer 2, bearer 3, . . . bearer 10 and etc., these 10 bearers execute services with external applications via three gateway devices, such as P-GW$_1$, P-GW$_2$, P-GW$_3$.

Similarly, bearers on UE$_2$ also execute services with external applications via the three gateway devices, for simplicity, black solid lines are used to denote bearers.

In this way, the identifier of the P-GW used by bearers of each user may be recorded in the eNB. For example, a table is used to record.

Then, when the cell of the eNB where UE$_1$ and UE$_2$ reside is congested, the access network device may choose bearer 1, bearer 6 and bearer 9 of $UE_1$ to notify gateway devices, such as $P\text{-}GW_1$, $P\text{-}GW_2$, $P\text{-}GW_3$, with which user plane data packets are transmitted. And data packets on other bearers, bearer 2, bearer 3 . . . of $UE_1$ do not need to include the congestion state indication any more, namely, do not continue reporting the congestion state information; bearers of $UE_2$ do not need to include the congestion state indication either, namely, do not continue reporting the congestion state information.

Or, bearers (the bears as shown in black solid lines of FIG. 3) of $UE_2$ which transmit user data to the three gateway devices (P-GW) are chosen to include the congestion state indication, for reporting to the network side the congestion state.

Or, part of bearers of $UE_1$ and part of bearers of $UE_2$ are chosen to notify the three gateway devices. For example, bearer 1 and bearer 8 of $UE_1$ are chosen to include the congestion state indication in their data packet heads, and for $P\text{-}GW_3$, the bearer of $UE_2$ can be chosen to execute the process of notifying the congestion state information.

Or, a plurality of bearers can be chosen to notify the three gateway devices. For example, bearer 1 and bearer 2 of $UE_1$ are chosen to include the congestion state indication in their data packet heads, for notifying the congestion to $P\text{-}GW_1$ and etc.

The aforementioned ways are only for exemplary purpose, the embodiment of the present invention does not limit the specific executing method, as long as the gateway device can be notified.

As can be seen from the above embodiment, in the congestion state reporting method of the present embodiment, during the process of establishing default bearers of the UE, the identifier of the gateway device at the core network side is obtained, and the congestion state information of the cell covered by the access network device is reported to the gateway device via part of bearers from the bearers corresponding to the identifier of the gateway device, thereby reducing the processing complexity of the gateway device on processing the cell congestion in the prior art, so that the gateway device can be simplified when processing the cell congestion, the processing performance of the gateway device can be better improved, and further the problem of aggravating the congestion in the prior art can be avoided.

Figure 5B:
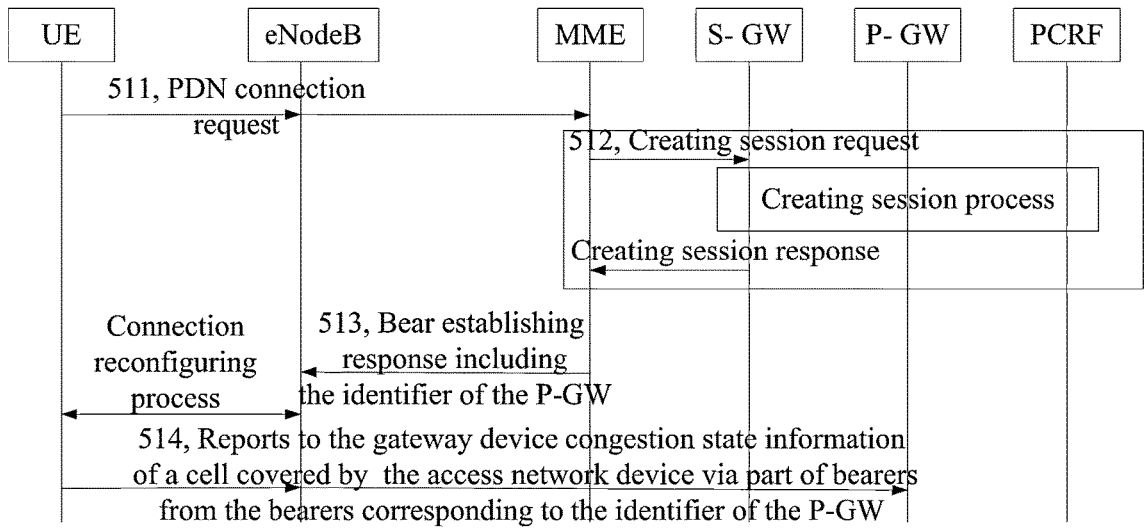

FIG. 5B shows a flow chart of a congestion state reporting method according to another embodiment of the present invention, as shown in FIG. 5B, the congestion state reporting method in this embodiment is described as below.

511, a UE sends a PDN connection establishing request including an identifier of the UE to an MME at a core network side via an eNB (eNodeB).

512, the MME sends a creating session request to an S-GW according to the PDN connection establishing request, and receives a response of the creating session request, namely, a creating session response, which is sent by the S-GW after a creating session process is finished, wherein the creating session request is used, mutually by the S-GW, a P-GW, a PCRF at the core network side, to complete a creating session process directing at the UE.

513, the eNB receives a bear establishing response which is sent by the MME according to the PDN connection establishing request, wherein the bear establishing response includes an identifier of the gateway device (namely an identifier of the P-GW).

Certainly, the eNB can realize, according to the bear establishing response, a reconfiguration process with the UE.

It should be noted that, in the actual application, both the creating session request and the bear establishing response include the identifier of the UE, such as an international mobile subscriber identification number (IMSI for short) and etc.

Besides, the identifier of the P-GW in this embodiment can be: an IP address of the P-GW, or a user plane data tunnel endpoint identifier (TEID), or a fully qualified domain name (FQDN for short) and etc. Of course, it can be a combination of the identifiers listed above.

514, the eNB stores the obtained identifier of the gateway device, and reports to the gateway device congestion state information of a cell covered by the access network device via part of bearers from the bearers corresponding to the identifier of the gateway device.

In other words, aiming at gateway devices with the same identifier, part of bearers from the bearers corresponding to the identifier of the gateway device are chosen to report to the gateway device the congestion state information.

It should be noted that, the aforementioned steps 511 and 512 in this embodiment are as same as steps of the creating session process in the prior art, and the present embodiment is only schematically described here.

Further, during a handover process of the UE from a source access network to a target access network, the identifier of the gateway device corresponding to the bears is obtained. For example, during the handover process of the UE from the source access network to the target access network, an access network device, which locates in the target access network, receives the identifier of the gateway device corresponding to the bearers sent by an access network device in the source access network. In other words, during the handover process of the UE from the source access network to another target access network, if the access network device connected to the UE changes, but the MME at the core network side does not change, and an interface of data transmission has been established between the two access network devices, then the access network device at the target access network side which is connected with the UE receives the identifier of the gateway device which is sent by the access network device in the source access network via the interface of data transmission.

or, during the handover process of the UE from the source access network to the target access network, the access network device, which locates in the target access network, receives the identifier of the gateway device corresponding to the bearers sent by a mobility management entity locating in the target access network. For example, the MME can send the identifier of the gateway device to the current eNB directly when learning that the eNB corresponding to the UE changes.

As can be seen from the above embodiment, the congestion state reporting method of the present embodiment can avoid the problem in the prior art that the congestion state is further aggravated, and does not bring too many changes to the present protocol, so that the problem of cell congestion can be processed by the gateway device more rapidly.

Figure 6A:
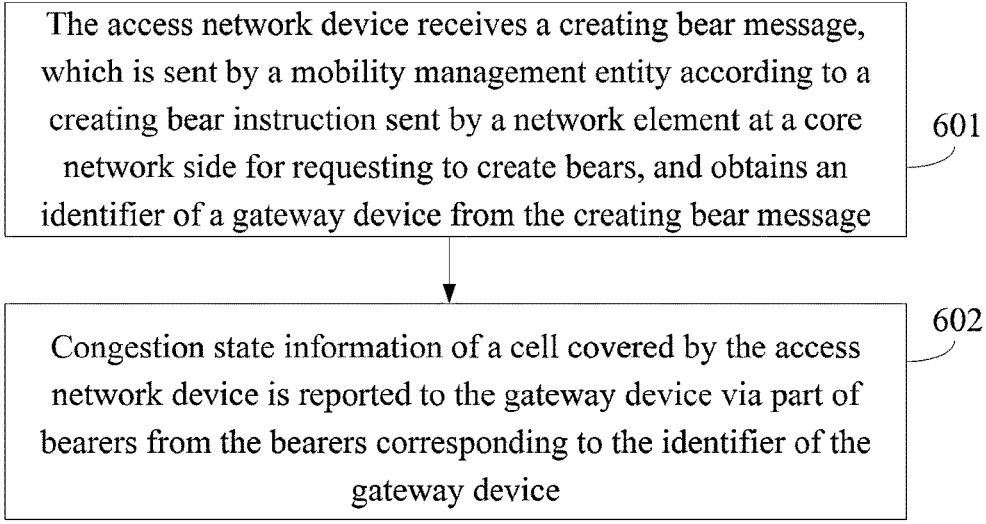
FIG. 6A and FIG. 6B are flow charts of congestion state reporting methods according to another embodiment of the present invention.

FIG. 6A shows a flow chart of a congestion state reporting method according to another embodiment of the present invention, as shown in FIG. 6A, the congestion state reporting method in this embodiment is described as below.

601, the access network device receives a creating bear message, and the creating bearer message is sent by a mobility management entity according to a creating bear instruction sent by a network element at a core network side for requesting to create bears, and the access network device obtains an identifier of a gateway device from the creating bear message.

For example, during the process of establishing dedicated bearers by the network element at the core network side for a UE, the access network device receives the creating bear message, and the creating bearer message is sent by the MME according to the creating bear instruction sent by the network element at the core network side for requesting to create dedicated bears, and the creating bear message includes the identifier of the gateway device.

602, congestion state information of a cell covered by the access network device is reported to the gateway device via part of bearers from the bearers corresponding to the identifier of the gateway device.

The congestion state reporting method in the present embodiment can avoid the problem in the prior art that the congestion state is further aggravated, and does not bring too many changes to the present protocol, so that the problem of cell congestion can be processed by the gateway device more rapidly.

Figure 6B:
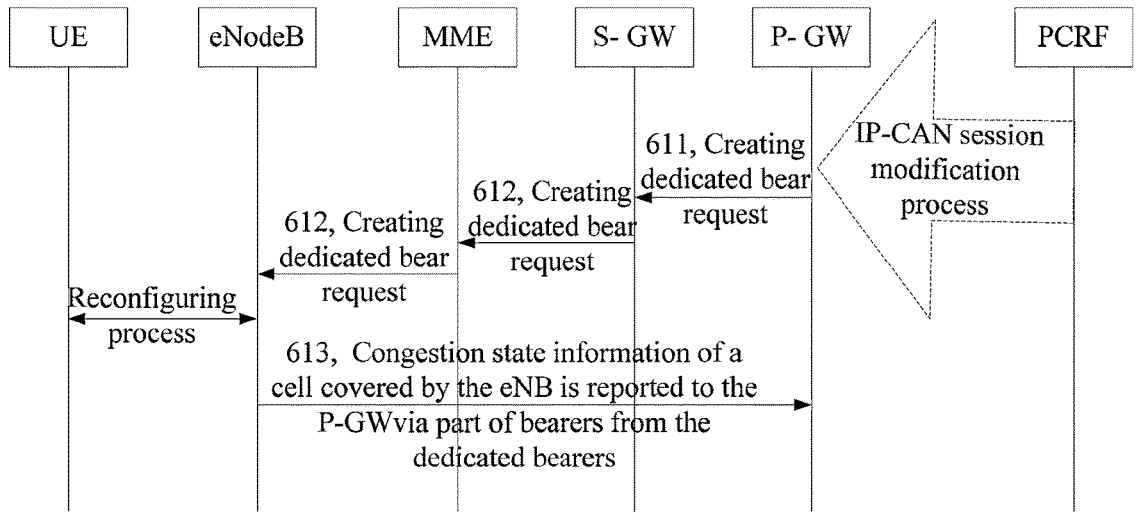

FIG. 6B shows a flow chart of a congestion state reporting method according to another embodiment of the present invention, as shown in FIG. 6B, the congestion state reporting method in this embodiment is described as below.

611, a PCRF at a core network side initiates an IP-CAN session modification request to a P-GW, and the P-GW sends to an S-GW a creating dedicated bear request according to the IP-CAN session modification request.

612, the S-GW sends the creating dedicated bear request to an MME, the MME sends the creating dedicated bear request to an access network device such as an eNB, wherein the creating dedicated bear request includes an identifier of the P-GW, and the eNB realizes, according to the creating dedicated bear request, a reconfiguring process with the UE.

613, according to the obtained identifier of the gateway device, congestion state information of a cell covered by the eNB is reported to the gateway device via part of bearers from the bearers corresponding to the identifier of the gateway device.

In other embodiments, the way of obtaining the identifier of the P-GW by the eNB can also be that: when the UE switches from an idle state to a connected state, the identifier of the gateway device corresponding to the bearers of the UE is obtained, for example, the eNB receives an initial context message which is returned by the MME according to a service request sent by the eNB, and obtains the identifier of the P-GW corresponding to the bearers from the initial context message.

In another embodiment, if both the dedicated bearers and the default bearers of the user equipment are established successfully, by this time, the way of obtaining the identifier of the P-GW by the eNB can be that: a downlink data packet sent by the core network side entity (such as a P-GW) via the established bearers is received, and the identifier of the gateway device is obtained from the downlink data packet. In this embodiment, the downlink data packet includes the identifier of the gateway device, preferably, the access network device receives a first downlink data packet sent by the network element at the core network side entity via the established bears. By this time, the identifier of the gateway device is obtained from the first downlink data packet, namely, the first downlink data packet includes the identifier of the P-GW.

The aforementioned congestion state reporting method can avoid the problem in the prior art that the congestion state is further aggravated, and does not bring too many changes to the present protocol, so that the problem of cell congestion can be processed by the gateway device more rapidly.

Figure 7:
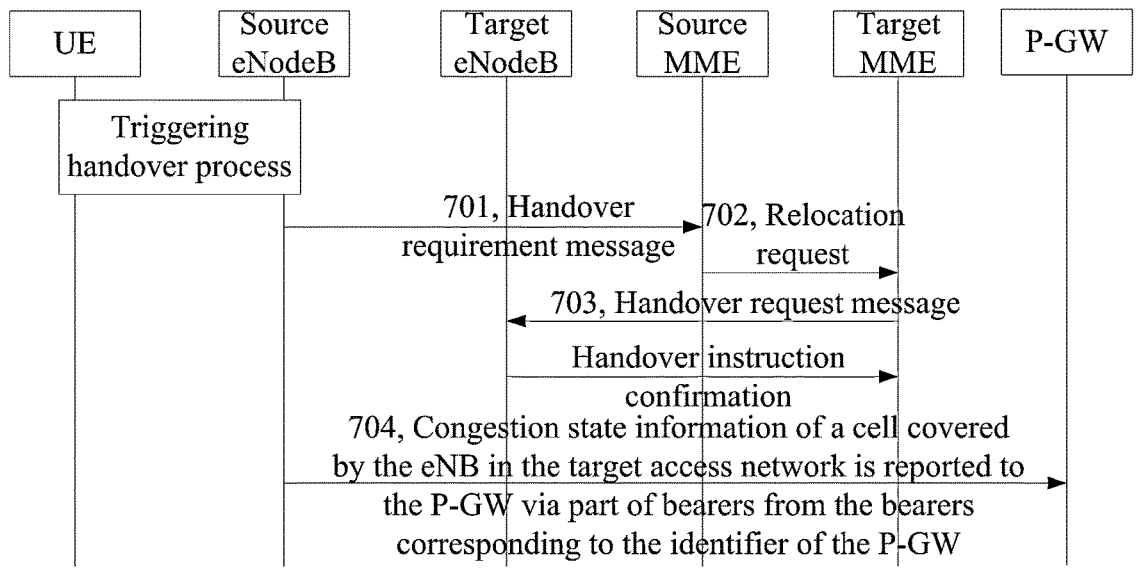
FIG. 7 is a flow chart of a congestion state reporting method according to another embodiment of the present invention.

FIG. 7 shows a flow chart of a congestion state reporting method according to another embodiment of the present invention, as shown in FIG. 7, the congestion state reporting method in this embodiment is described as below.

In this embodiment, a handover of a cell where the UE locates takes place while the UE is moving, by this time, if the UE switches from a source access network to a target access network, the devices by which the UE accesses the communication network, such as an eNB, MME, all change.

701, during the movement of the UE, if a network element in the current access network (namely the network element in the source access network, such as a Source eNodeB, Source MME) can not service the UE, then a process of switching to a network element in the target access network for the UE is initiated, the network element in the source access network sends to the Source MME a handover requirement message, and the handover requirement message can include, but not limited to, the identifier of the P-GW, an identifier of the UE, an identifier of the network element in the target access network.

702, the Source MME sends, according to the identifier of the network element in the target access network, to a target MME (Target MME as shown in the figure) a relocation request, and the relocation request includes the identifier of the P-GW, the identifier of the UE.

703, the target MME sends, according to the relocation request, to the access network device (Target eNB as shown in the figure) in the target access network a handover request message, and the handover request message includes the identifier of the P-GW, the identifier of the UE.

Correspondingly, the access network device such as an eNB in the target access network sends, according to the handover request message, to the target MME a handover instruction confirmation, and the handover of the current UE from the source access network to the target access network is realized after receiving a confirmation response message.

704, the access network device in the target access network stores the obtained identifier of the P-GW, and the congestion state information of a cell covered by the eNB in the target access network is reported to the P-GW via part of bearers from the bearers corresponding to the identifier of the P-GW.

The aforementioned congestion state reporting method can avoid the problem in the prior art that the congestion state is further aggravated, and does not bring too many changes to the present protocol, so that the problem of cell congestion can be processed by the gateway device more rapidly.

Figure 8:
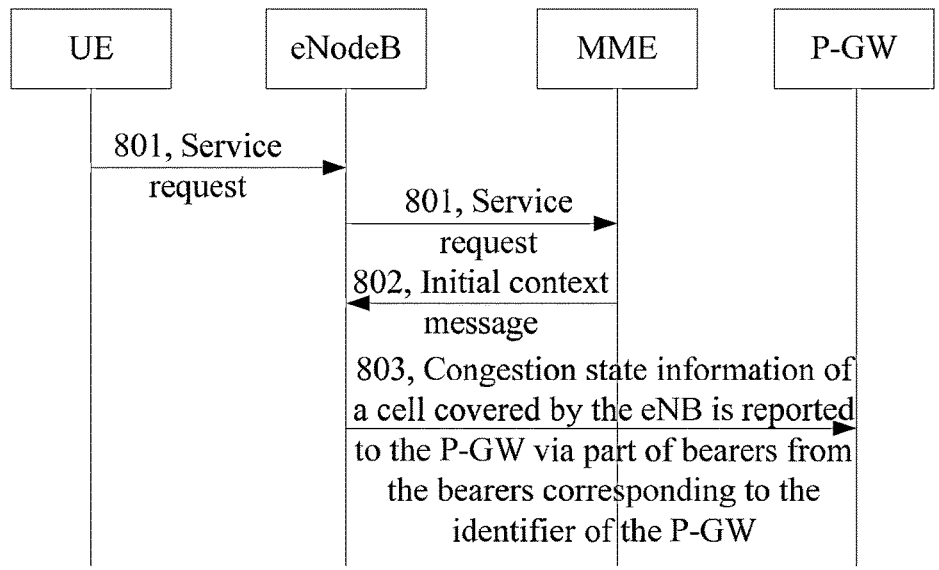
FIG. 8 is a flow chart of a congestion state reporting method according to another embodiment of the present invention.

FIG. 8 shows a flow chart of a congestion state reporting method according to another embodiment of the present invention, as shown in FIG. 8, the congestion state reporting method in this embodiment is described as below.

Usually, the UE switches to an idle state when no data are transmitted and no signaling process is performed with the communication network side.

When the UE switches to the idle state, the context information of the UE and identifier information of a gateway device in the aforementioned embodiments, which are saved in an access network device, are both erased. By this time, the access network device needs to obtain an identifier of the gateway device again when the UE switches from the idle state to the connected state.

In the actual application, the handover process of the UE from the idle state to the connected state may be a service requesting process, or a periodical position updating process, and this embodiment is described taking the service requesting process as an example.

801, when the UE switches from the idle state to the connected state, the access network device such as an eNB receives a service request sent by the UE, and sends the service request to an MME.

802, the access network device such as the eNB receives an initial context message which is returned by the MME at the core network side according to the service request sent by the access network device such as the eNB, and obtains the identifier of the gateway device corresponding to bearers from the initial context message.

803, congestion state information of a cell covered by the access network device is reported to the gateway device via part of bearers from the bearers corresponding to the identifier of the gateway device.

It should be noted that, if the switching of the UE from the idle state to the connected state is via the periodical position updating process, then via the periodical position updating receiving messages, the MME may notify the access network device of the identifier of the gateway device accessed by the PDN connection of the UE.

In the aforementioned congestion state reporting method, the access network device can choose a specific bearer aiming at each gateway device to report to the network side the congestion state via the uplink data packets, which avoids a lot of actions of repeatedly sending the data packets for reporting congestion state, and decreases the operation of the gateway device, so that the purpose of energy saving and emission reduction can be attained.

In another embodiment, which may also be appeared is: after bears of the UE are established successfully, the access network device receives downlink data packets sent by a network element at a core network side via the established bears, any one of the downlink data packets can include the identifier of the gateway device, and then the identifier of the gateway device can be obtained from the downlink data packet.

Specifically, the access network device receives the first downlink data packet sent by the network element at the core network side, and the first downlink data packet includes the identifier of the gateway device.

The identifier of the gateway device included in the downlink data packets is shown in Table 1.

TABLE 1

| Octets (Octets) 1 | Extension Header Length (Extension Header Length) |
| 2 – m | the identifier of the gateway device |
| m + 1 | Next Extension Header Type (Next Extension Header Type) |

In the aforementioned congestion state reporting method, the access network device may choose a specific bearer on account of each gateway device to report to the network side the congestion state information via an uplink data packet, which avoids a lot of actions of repeatedly sending the data packets for reporting congestion state, and decreases the operation of the gateway device, so that the purpose of energy saving and emission reduction is attained.

On the other hand, on account of a probably existing terminal that has only lots of downlink user plane data packets to be transmitted and no uplink data packet, the aforementioned congestion state reporting method can handle timely, thereby increasing the processing performance of the gateway device.

Besides, it should be noted that, a solution of detecting the congestion of a covered cell by the access network device may be: determining whether the cell is congested by periodically checking whether online users of the cell reach a congestion threshold value. In particular, the way by which the access network device detects that the cell is congested is available in the prior art, which is not specified in this embodiment.

Any one of the above embodiments is described taking a system architecture evolution (SAE for short) architecture as an example, and this technology is also applicable in the UMTS architecture, for example, in the flowcharts shown in FIG. 5A, FIG. 5B, and FIG. 6A, FIG. 6B, the mobility management entity is a GGSN, which can notify the identifier of the gateway device (GGSN) to the access network element (such as a RNC) in a RAB designating process of a packet data protocol (PDP for short) context establishing process or in an activating PDP context receiving message. Of course, the GGSN identifier can have multiple concrete forms in any one of the embodiments under this system architecture.

Figure 9:
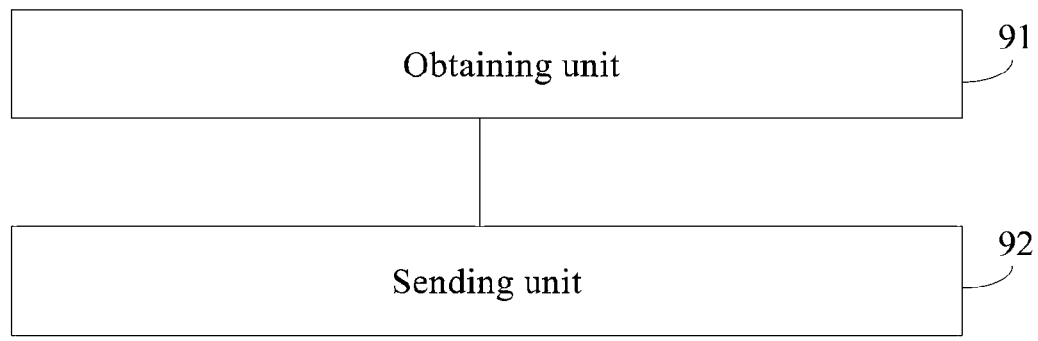
FIG. 9 is a schematic structural diagram of an access network device according to another embodiment of the present invention.

According to another aspect of the present invention, the present invention further provides an access network device, as shown in FIG. 9, the access network device can execute the processing procedure of the access network device in the above-mentioned method embodiments, and the access network device includes: an obtaining unit 91 and a sending unit 92;

Wherein, the obtaining unit 91 is configured to obtain an identifier of a gateway device corresponding to bearers; the sending unit 92 is configured to report to the gateway device congestion state information of a cell covered by the access network device via part of bearers from the bearers corresponding to the identifier of the gateway device.

Preferably, the obtaining unit 91 is specifically configured to: receive a bear establishing response which is returned by a mobility management entity according to a bear establishing request sent by the access network device for requesting to establish the bears, and obtain the identifier of the gateway device from the bear establishing response.

In another scenario, the obtaining unit 91 is specifically configured to: receive a creating bear message which is sent by a mobility management entity according to a creating bear instruction sent by a network element at a core network side for requesting to create the bears, and obtain the identifier of the gateway device from the creating bear message.

The aforementioned sending unit 92 is specifically configured to: when a cell covered by the access network device is congested, report to the gateway device the congestion state information via one bearer from the bearers corresponding to the identifier.

In the third applicable scenario, the obtaining unit 91 is specifically configured to: during a handover process of a user equipment from a source access network to a target access network, receive by the access network device which locates in the target access network, the identifier of the gateway device corresponding to the bearers sent by an access network device in the source access network;

or, during the handover process of the user equipment from the source access network to the target access network, receive by the access network device which locates in the target access network, the identifier of the gateway device corresponding to the bearers sent by a mobility management entity locating in the target access network.

In the forth applicable scenario, the obtaining unit 91 is specifically configured to: when a user equipment switches from an idle state to a connected state, receive an initial context message which is returned by a mobility management entity according to a service request sent by the access network device, and obtain the identifier of the gateway device corresponding to the bearers from the initial context message.

In the fifth applicable scenario, the obtaining unit 91 is specifically configured to: receive at least one downlink data packets sent by a network element at a core network side via the bears, and obtain the identifier of the gateway device from the downlink data packets. Preferably, the obtaining unit 91 is specifically configured to receive a first downlink data packet sent by the network element at the core network side via the bears, and obtain the identifier of the gateway device from the first downlink data packet.

The aforementioned access network device can choose a specific bearer on account of each gateway device to report to the network side the congestion state information via the uplink data packet, which avoids a lot of actions of repeatedly sending the data packets for reporting congestion state, and decreases the operation of the gateway device, so that the purpose of energy saving and emission reduction is attained.

In the actual application, the access network device in the embodiments of the present invention can include a processor and a storage, wherein the processor is configured to obtain the identifier of the gateway device corresponding to the bearers, the storage is configured to store the identifier of the gateway device and store the bearers corresponding to the identifier of the gateway device (such as storing a corresponding table between the identifier of the gateway device and the bearers, etc.), and the processor reports to the gateway device the congestion state information of a cell covered by the access network device via part of bearers from the bearers corresponding to the identifier of the gateway device.

It should be noted that, in the above embodiments of the access network device, the division of the respective functional units is merely illustrated, and in the actual application, the above different functions are allocated to be accomplished by different functional units according to requirements, such as the configuration requirement of corresponding hardware or the convenience of software implementation, that is, the internal structure of the access network device is divided into different functional units for accomplishing all or partial aforementioned functions. In addition, in the actual application, the corresponding functional units according to the embodiment may be accomplished by corresponding hardware, and also may be accomplished by executing corresponding software by corresponding hardware, for example, the aforementioned sending unit may be a hardware which executes functions of the aforementioned sending unit, such as a transmitter, or a general processor or other hardware which can accomplish the aforementioned functions by executing corresponding computer programs.

Persons of ordinary skill in the art can understand that all or part of the steps of the above method embodiments can be implemented by a program instructing relevant hardware. The program can be stored in a computer readable storage medium. When the program executes, the foregoing steps of the above method embodiments are performed. The storage medium can be any medium capable of storing program codes, such as ROM, RAM, magnetic disk, or optical disk.

Finally, it should be noted that the foregoing embodiments are merely intended to describe the technical solutions of the present invention other than limit the present invention. Although the present invention is described in detail with reference to the foregoing embodiments, a person of ordinary skill in the art should understand that he may still make modifications to the technical solutions described in the foregoing embodiments, or make equivalent replacements to some or all technical features thereof, and such modification and replacement cannot make the essence of the corresponding technical solutions depart from the scope of the technical solutions of the embodiments of the present invention.

What is claimed is:

1. A congestion state reporting method, comprising:
obtaining, by an access network device, an identifier of each of multiple gateway devices, wherein each of the multiple gateway devices has multiple bearers established with the access network device;
choosing, by the access network device, one or more but not all of the multiple bearers established with the access network device for each of the multiple gateway devices; and
reporting, to each of the multiple gateway devices, congestion state information of a cell covered by the access network device via the one or more chosen bearers.

2. The method according to claim 1, wherein the choosing, by the access network device, one or more but not all of the multiple bearers established with the access network device for each of the multiple gateway devices comprises:
choosing, by the access network device, one of the multiple bearers established with the access network device corresponding to the identifier for each of the multiple gateway devices.

3. The method according to claim 1, wherein the obtaining, by the access network device, the identifier of each of the gateway devices, wherein each of the multiple gateway devices has the multiple bearers established with the access network device comprises:
receiving, by the access network device, a bearer establishing response, wherein the bearer establishing response is returned by a mobility management entity according to a bearer establishing request, wherein the bearer establishing request is sent by the access network device for requesting to establish the bearer; and
obtaining the identifier of each of the multiple gateway devices from the bearer establishing response.

4. The method according to claim 1, wherein the obtaining, by the access network device, the identifier of each of the multiple gateway devices, wherein each of the multiple gateway devices has the multiple bearers established with the access network device comprises:
receiving, by the access network device, a creating bearer message, wherein the creating bearer message is sent by a mobility management entity according to a creating bearer instruction, wherein the creating bearer instruction is sent by a network element at a core network side for requesting to create the bearer; and
obtaining the identifier of each of the multiple gateway devices from the creating bearer message.

5. The method according to claim 1, wherein the obtaining, by the access network device, the identifier of each of the multiple gateway devices, wherein each of the multiple gateway devices has the multiple bearers established with the access network device comprises:
during a handover process of a user equipment from a source access network to a target access network, receiving, by the access network device locating in the target access network, the identifier of each of the multiple gateway devices, wherein each of the multiple gateway devices has the multiple bearers established with the access network device, wherein the identifier of each of the multiple gateway devices is sent by an access network device in the source access network or is sent by a mobility management entity located in the target access network.

6. The method according to claim 1, wherein the obtaining, by the access network device, the identifier of each of the multiple gateway devices, wherein each of the multiple gateway devices has the multiple bearers established with the access network device comprises:
receiving, by the access network device, an initial context message, wherein the initial context message is returned by a mobility management entity according to a service request, wherein the service request is sent by the access network device; and
obtaining, the identifier of each of the multiple gateway devices, wherein each of the multiple gateway devices has the multiple bearers established with the access network device, from the initial context message.

7. The method according to claim 1, wherein the obtaining, by the access network device, the identifier of each of the multiple gateway devices, wherein each of the multiple gateway devices has the multiple bearers established with the access network device comprises:
receiving, by the access network device, a downlink data packet sent by a network element at a core network side via the multiple bearers; and
obtaining the identifier of each of the multiple gateway devices from the downlink data packet.

8. The method according to claim 7, wherein the downlink data packet is a first downlink data packet sent by the network element at the core network side.

9. An access network device, comprising a processor and a non-transitory processor-readable medium having processor-executable instructions stored thereon, the processor-executable instructions causing the processor to:
obtain an identifier of each of multiple gateway devices, wherein each of the multiple gateway devices has multiple bearers established with the access network device;
choose one or more but not all of the multiple bearers established with the access network device for each of the multiple gateway devices; and
report to each of the multiple gateway devices congestion state information of a cell covered by the access network device via the one or more chosen bearers.

10. The access network device according to claim 9, wherein the processor-executable instructions cause the processor to:
receive a bearer establishing response, wherein the bearer establishing response is returned by a mobility management entity according to a bearer establishing request, wherein the bearer establishing request is sent by the access network device for requesting to establish the bearers; and
obtain the identifier of each of the multiple gateway devices from the bearer establishing response.

11. The access network device according to claim 9 wherein the processor-executable instructions cause the processor to:
receive a creating bearer message, wherein the creating bearer message is sent by a mobility management entity according to a creating bearer instruction, wherein the creating bearer instruction is sent by a network element at a core network side for requesting to create the bearers; and
obtain the identifier of each of the multiple gateway devices from the creating bearer message.

12. The access network device according to claim 9, wherein the processor-executable instructions cause the processor to:
during a handover process of a user equipment from a source access network to a target access network, receive, by the access network device located in the target access network, the identifier of each of the multiple gateway devices, wherein each of the multiple gateway devices has the multiple bearers established with the access network device, wherein the identifier of each of the multiple gateway devices is sent by an access network device in the source access network.

13. The access network device according to claim 9, wherein the processor-executable instructions cause the processor to:
receive, when a user equipment performs handover from an idle state to a connected state, an initial context message, wherein the initial context message is returned by a mobility management entity according to a service request sent by the access network device; and
obtain the identifier of each of the multiple gateway devices, wherein each of the multiple gateway devices has the multiple bearers established with the access network device, from the initial context message.

14. The access network device according to claim 9, wherein the processor-executable instructions cause the processor to:
receive a downlink data packet sent by a network element at a core network side via the multiple bearers; and
obtain the identifier of each of the multiple gateway devices from the downlink data packet.

15. The access network device according to claim 9, wherein the processor-executable instructions cause the processor to:
receive a first downlink data packet sent by the network element at the core network side via the multiple bearers; and
obtain the identifier of each of the multiple gateway devices from the first downlink data packet.

16. The access network device according to claim 9, wherein the processor-executable instructions cause the processor to:
choose one of the multiple bearers established with the access network device corresponding to the identifier for each of the multiple gateway devices.

17. The access network device according to claim 9, wherein the processor-executable instructions cause the processor to:
during a handover process of a user equipment from a source access network to a target access network, receive, by the access network device located in the target access network, the identifier of each of the multiple gateway devices, wherein each of the multiple gateway devices has the multiple bearers established with the access network device, wherein the identifier of each of the multiple gateway devices is sent by a mobility management entity locating in the target access network.

18. The method according to claim 1, wherein the choosing, by the access network, one or more but not all of the multiple bearers established with the access network device for each of the multiple gateway devices comprises:

choosing, by the access network, one or more but not all of the multiple bearers established with the access network device corresponding to the identifier for each of the multiple gateway devices according to a correspondence between the identifier of the gateway device and the multiple bearers established with the access network device.

19. The access network device according to claim 9, wherein the processor-executable instructions cause the processor to:

choose one or more but not all of the multiple bearers established with the access network device corresponding to the identifier for each of the multiple gateway devices according to a correspondence between the identifier of the gateway device and the multiple bearers established with the access network device.

\* \* \* \* \*